United States Patent
Cardone

(10) Patent No.: US 7,038,566 B2
(45) Date of Patent: May 2, 2006

(54) MAGNETIC PALLET FOR ANCHORAGE OF FERROMAGNETIC PARTS FOR MACHINING BY MACHINE TOOLS WITH HORIZONTAL TOOL AXIS

(75) Inventor: Michele Cardone, Milan (IT)

(73) Assignee: Tecnomagnete S.p.A., Milan (IT)

( * ) Notice: Subject to any disclaimer, the term of this patent is extended or adjusted under 35 U.S.C. 154(b) by 211 days.

(21) Appl. No.: 10/488,996

(22) PCT Filed: Sep. 5, 2002

(86) PCT No.: PCT/EP02/09916

§ 371 (c)(1),
(2), (4) Date: Mar. 10, 2004

(87) PCT Pub. No.: WO03/022514

PCT Pub. Date: Mar. 20, 2003

(65) Prior Publication Data

US 2004/0233026 A1 Nov. 25, 2004

(30) Foreign Application Priority Data

Sep. 10, 2001 (IT) .................................. MI2001A1886

(51) Int. Cl.
*H01F 7/20* (2006.01)

(52) U.S. Cl. .......................................... 335/289; 269/8
(58) Field of Classification Search ......... 335/285–295; 269/8
See application file for complete search history.

(56) References Cited

U.S. PATENT DOCUMENTS

| | | | | | |
|---|---|---|---|---|---|
| 1,673,719 | A | * | 6/1928 | Tracy | 335/289 |
| 2,409,017 | A | * | 10/1946 | Carson | 335/295 |
| 3,142,787 | A | * | 7/1964 | Levesque | 335/295 |
| 3,812,629 | A | * | 5/1974 | Campbell | 451/364 |
| 4,090,162 | A | * | 5/1978 | Cardone et al. | 335/289 |
| 4,507,635 | A | * | 3/1985 | Cardone et al. | 335/291 |
| 4,847,582 | A | * | 7/1989 | Cardone et al. | 335/289 |
| 4,956,625 | A | * | 9/1990 | Cardone et al. | 335/290 |
| 5,266,914 | A | * | 11/1993 | Dickson et al. | 335/288 |

FOREIGN PATENT DOCUMENTS

| | | |
|---|---|---|
| EP | 0 345 554 | 12/1989 |
| FR | 2 548 945 | 1/1985 |

* cited by examiner

*Primary Examiner*—Ramon M. Barrera
(74) *Attorney, Agent, or Firm*—Young & Thompson

(57) ABSTRACT

A magnetic pallet (1) for anchorage of a ferromagnetic part to be taken for machining to a machine tool with horizontal tool axis, the magnetic pallet (1) including a base plate (3), a vertical parallelepiped shoulder (5) extending from the base plate (3), a first plurality of magnetic conductors (15) arranged in a matrix and which can be polarised magnetically so as to define a first surface for vertical magnetic anchorage of ferrous parts at a first lateral face (4) of the shoulder (5). The base plate (3) and the shoulder (5) are formed from a single ferromagnetic monolithic block, and in that from the ferromagnetic monolithic block, at the first lateral face (4) of the shoulder (5), a first recess (7) is formed for housing the first plurality of magnetic conductors (15).

5 Claims, 3 Drawing Sheets

MAGNETIC PALLET FOR ANCHORAGE OF FERROMAGNETIC PARTS FOR MACHINING BY MACHINE TOOLS WITH HORIZONTAL TOOL AXIS

The present invention relates to a magnetic pallet for the anchorage of a ferrous part to be machined by a machine tool with horizontal tool axis.

This magnetic pallet comprises notoriously a base plate driven to traverse the bed of the machine tool to bring the part to be machined into the work area and to remove the machined part from the work area, and a vertical parallelepiped shoulder attached to the base plate and at least one vertical magnetic surface which can be polarised to achieve anchorage of the part.

Each magnetic anchorage surface with which the pallet is provided is composed of a plurality of magnetic conductors arranged in a matrix and each one is supplied by a corresponding permanent and reversible magnet encircled by an electric induction coil capable of changing the direction of polarisation of the permanent magnet so as to commutate the magnetic surface from the activated condition to the de-activated one and vice versa.

The magnetic surface is surrounded and protected by a ferromagnetic crown which is part of the magnetic circuit generated by the permanent reversible magnets both in the activated condition and in the de-activated condition of the magnetic surface.

The ferromagnetic crown, inside of which the magnetic conductors are placed with the relative permanent reversible magnets and, if necessary, with other secondary permanent magnets also supplying the magnetic conductors, is placed on a corresponding lateral face of the shoulder of the magnetic pallet.

The magnetic pallet has to have structural rigidity and stability so as to guarantee that machining of the part can be performed while maintaining extreme machining precision.

Nevertheless, for example when machining of the part moves to the apex portion of the magnetic pallet, the action of the tool on the part may cause slight yields or temporary deformation of the structure of the magnetic pallet and the movement induced in this way of the relative position between the workpiece and tool may jeopardise machining precision.

Clearly the slight structural yields which may occur inside the structure of the pallet mainly originate at the areas of joining, formed by welding or by means of tightening screws, or another known manner, between the base plate and the shoulder, and between the shoulder and the ferromagnetic crown placed on the shoulder.

The object of the present invention is therefore that of providing a magnetic pallet and a method for the production of a magnetic pallet for anchorage of a ferrous part to be machined by a machine tool with horizontal tool axis, which magnetic pallet has intrinsic stability and rigidity such as to allow extremely precise and thorough machining of the part.

Another object of the present invention is that of providing a magnetic pallet and a method for production of a magnetic pallet which are inexpensive.

These objects are achieved by a magnetic pallet in accordance with claim 1 and by a method of producing a magnetic pallet in accordance with claim 5.

The magnetic pallet is obtained by machining a round or square rod or more generally a ferromagnetic slab, preferably in steel, so as to shape the base plate, the shoulder and a recess for each of the magnetic anchorage surfaces provided.

Production of a magnetic pallet from a monolithic block allows considerably improved structural rigidity and stability thanks to elimination of the areas of joining between the base plate and the vertical shoulder and between the vertical shoulder and the ferromagnetic crown of the magnetic anchorage surfaces of traditional apparatus.

The magnetic pallet of the present invention is therefore suitable for use for machining parts with high precision.

These advantageous aspects will be made clearer by the following description of a preferred embodiment of the invention, to be read by way of a non-limiting example of the more general principle claimed. The description refers to the accompanying drawings in which:

Figure 1:
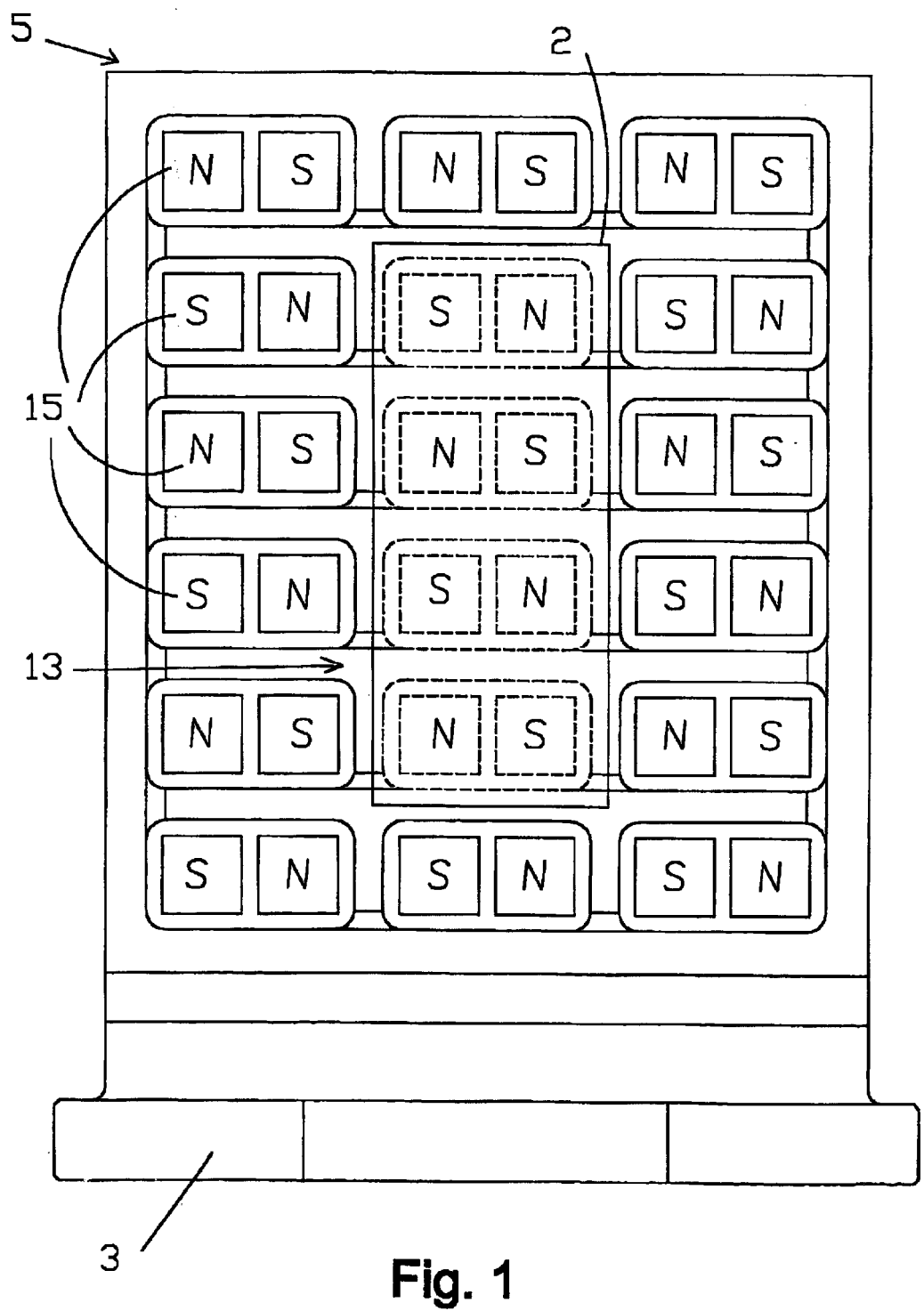
FIG. 1 illustrates a front view of a magnetic pallet in accordance with a preferred embodiment of the present invention with the magnetic anchorage surface activated.

Referring to the drawings, the magnetic pallet 1 for anchorage of a ferrous part 2 to be machined by a machine tool with horizontal tool axis comprises a base plate 3 which can be made to traverse the bed of the machine tool to bring the ferrous part to be machined towards the work section and to remove the machined ferrous part towards the unloading section, and a vertical shoulder 5 with a parallelepiped shape which extends upwards from the base plate 3. The base plate 3 and the shoulder 5 are formed in one single part by the machining of a single ferromagnetic monolithic block, preferably in steel.

At a vertical lateral face 4 of the shoulder 5 a rectangular recess 7 of the shoulder 5 is provided, defining a back 9 and a lateral wall 11 (in addition to any vertically and horizontally extended intermediate walls), which recess 7 serves to house a plurality of magnetic conductors 15 arranged in a matrix and aimed at defining a vertical magnetic anchorage surface 13.

It should be noted that the recess 7 is formed by chip machining from the same ferromagnetic monolithic block which forms the base plate 3 and the shoulder 5 of the magnetic pallet 1.

As mentioned, in the recess of the shoulder 5 the magnetic conductors 15 are fixed, which conductors have a parallelepiped shape with horizontal axis orthogonal to the lateral face 4 of the shoulder 5, the end bases of the magnetic conductors 15 in relation to said axis being square in shape.

Between the internal base of each magnetic conductor 15 and the back 9 of the ferromagnetic crown 7 a primary reversible permanent magnet 7 is interposed, having the horizontal magnetic polarisation axis (indicated by the direction of the arrow represented in the permanent magnets 17) directed orthogonally to the internal base of the magnetic conductor 15, which primary permanent magnet 17 is surrounded by an electrical coil 19 which can be supplied with an electrical current in one direction or in the opposite direction so as to reverse the direction (indicated by the tip of the arrow represented in the primary permanent magnets 17) of the magnetic polarity of the primary permanent magnet 17.

Between each of the lateral faces of each magnetic conductor 15 and the opposite lateral face of the adjacent magnetic conductors 15 or the opposite lateral wall 11 of the recess 7, if the magnetic conductor 15 is peripheral in relation to the matrix arrangement of the magnetic conductors 15, a secondary permanent magnet 21 is interposed. The axis of magnetic polarisation (denoted by the direction of the arrow represented in the permanent magnets 21) of each secondary magnet 21 is orthogonal to the lateral face of the magnetic conductors 15, while the direction of magnetic polarisation (indicated by the tip of the arrow represented in the permanent magnets 21) of each secondary magnet 21 is such that each magnetic conductor 15 is supplied laterally by magnetic poles of the same sign.

In the case of the peripheral magnetic conductors 15 in the matrix arrangement of the magnetic conductors 15, the secondary permanent magnets 21 arranged on the peripheral sides of the magnetic conductors 15 are in contact directly with the lateral wall 11 of the recess 7.

An epoxy resin 23 or another non-magnetic material is poured inside the recess 7 to fill the gaps between the adjacent magnetic conductors 15, between the magnetic conductors 15 and the lateral wall 11 of the recess 7, and between the magnetic conductors 15 and the back 9 of the recess 7.

Figure 2:
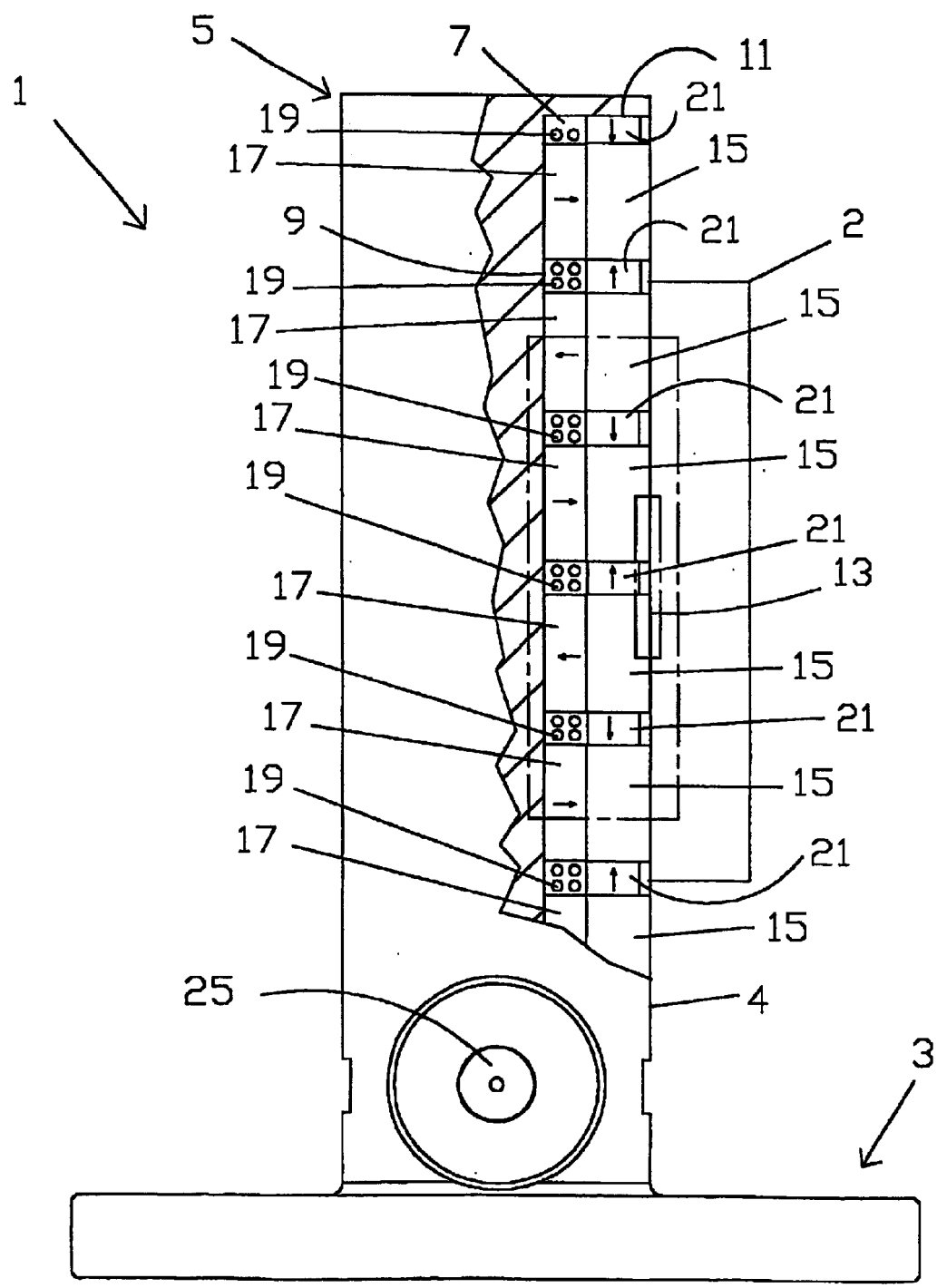
FIG. 2 shows a side elevation view of the magnetic pallet of FIG. 1 partially sectioned in the condition of activation of a magnetic surface.
Figure 3:
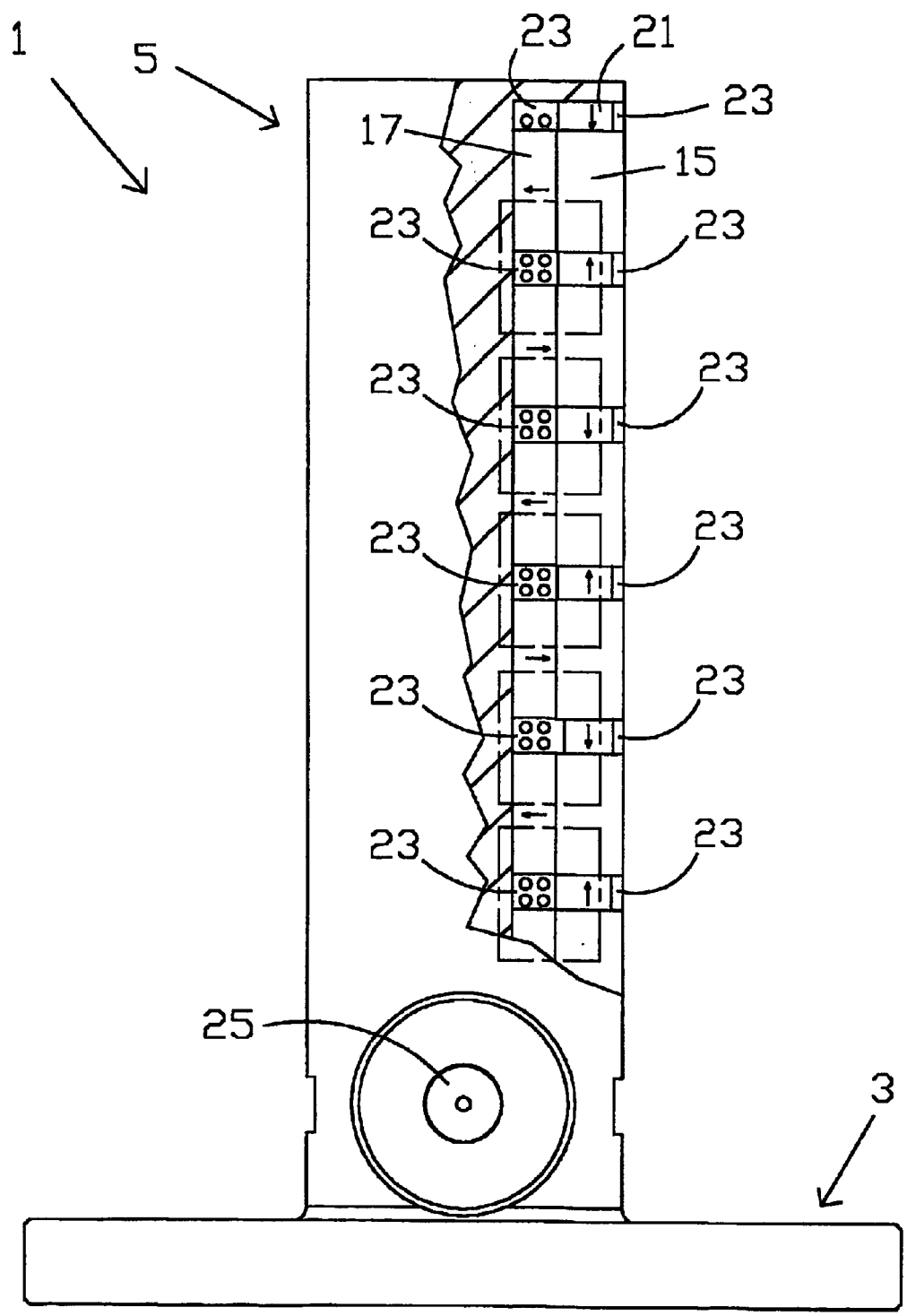
FIG. 3 shows a side elevation view of the magnetic pallet of FIG. 1 partially sectioned in the condition of de-activation of a magnetic surface.

25 in FIGS. 2 and 3 denotes a channel formed in the lower portion of the shoulder 5 for laying of the electrical wiring required for supplying the coils 19 of the reversible permanent magnets 17.

In the de-activated condition of the magnetic surface 13 each primary permanent magnet 17 supplies the corresponding magnetic conductor 15 with a magnetic pole of opposite sign to the magnetic poles supplied to the same magnetic conductor 15 by the secondary permanent magnets 21 which surround it. In this situation the magnetic flux generated by the primary permanent magnets 17 and by the secondary permanent magnets 21 closes entirely through the recess 7 without influencing the magnetic surface 13, as illustrated by the line of magnetic flux indicated by a dotted line in FIG. 3. In order to do this it is only necessary to ensure that the magnetic flux generated overall by the four secondary permanent magnets 21 of each magnetic conductor 15 is equal to that generated by the primary permanent magnet 17.

In the activated condition of the magnetic surface 13 the primary permanent magnet 17 and the secondary permanent magnets 21 surrounding each magnetic conductor 15 supply the same pole to the magnetic conductor 15. Each magnetic conductor 15 is polarised so that the magnetic anchorage surface 13 activates, defining a matrix of poles wherein each pole has laterally poles of opposite sign to its sign, and diagonally poles of identical sign to its sign ("N" stands for north pole and "S" for south pole in FIG. 1). In this situation the magnetic flux generated by the primary reversible permanent magnets 17 and by the secondary permanent magnets 21 closes entirely through the ferrous part 2 as illustrated by the lines of flux indicated by a dotted line in FIG. 2.

The through section of the lateral wall and of the back of the recess 7 must be sufficient for sustaining without dispersion the magnetic flux generated by the primary and secondary magnets. In this way, in addition to optimising the power of magnetic anchorage in the activated condition of the magnetic anchorage surface, advantageously the magnetic pallet becomes completely inert in the de-activated condition of the magnetic anchorage surface.

It must be clear that the distribution of the polarities of the poles of the magnetic anchorage surface can be differentiated from that illustrated here with a different arrangement of the permanent magnets which generate the magnetic circuit.

For example a distribution in groups of poles of the same polarity is possible in such a way as to vary the depth of penetration of the magnetic field through the parts to be anchored.

Although a magnetic pallet with a single magnetic anchorage surface has been described for the sake of simplicity, it is clear that by the same principle a magnetic pallet can be provided which has up to five magnetic anchorage surfaces which can be activated independently, namely one per vertical lateral face of the magnetic pallet plus one on the upper horizontal face of the pallet.

What is claimed is:

1. A magnetic pallet (1) for the anchorage of a ferrous part to be taken for machining by a machine tool with horizontal tool axis, said magnetic pallet (1) comprising a base plate (3), a vertical parallelepiped shoulder (5) extending from the base plate (3), a first plurality of magnetic conductors (15) arranged in a matrix and which can be polarised magnetically so as to define a first magnetic anchorage surface at a first lateral face (4) of said shoulder (5), characterised in that said base plate (3) and said shoulder (5) are formed from a single ferromagnetic monolithic block, and in that in said ferromagnetic monolithic block, at said first lateral face (4) of said shoulder (5), a first recess (7) is provided for housing said first plurality of magnetic conductors (15).

2. A magnetic pallet (1) according to claim 1, characterised in that said monolithic block is in ferromagnetic steel.

3. A magnetic pallet (1) according to claim 1, characterised in that said first plurality of magnetic conductors (15) has a parallelepiped shape with horizontal axis orthogonal to said first lateral face (4) of said shoulder (5), and in that a first plurality of primary reversible permanent magnets (17) is provided, each of said reversible permanent magnets (17) being surrounded by a corresponding electrical induction coil (19) and being interposed between the back of said recess and the axially internal base of a corresponding magnetic conductor (15) of said first plurality of magnetic conductors (15), each of said reversible permanent magnets (17) having the horizontal polarisation axis orthogonal to said axially internal base of said corresponding magnetic conductor (15).

4. A magnetic pallet (1) according to claim 1, characterised in that said monolithic block is in ferromagnetic steel.

5. Method for the production of a magnetic pallet (1) for the anchorage of a ferromagnetic part to be taken for machining to a machine tool with horizontal tool axis, characterised in that it provides the following phases of machining of a ferromagnetic monolithic block:

formation from said monolithic block of a base plate (3);

formation from said monolithic block of a vertical parallelepiped shoulder (5) extending from the base plate (3); and formation from said monolithic block of at least a first recess (7) for housing a corresponding first plurality of magnetic conductors (15) arranged in a matrix and which can be polarised magnetically so as to define a first magnetic anchorage surface at a first lateral face (4) of said shoulder (5).

* * * * *